C. M. TALCOTT, A. W. C. WILLIAMS & G. J. CAPEWELL.
Horseshoe-Nail.
No. 226,254. Patented April 6, 1880.
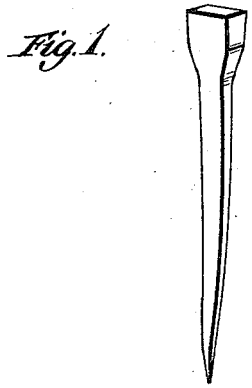
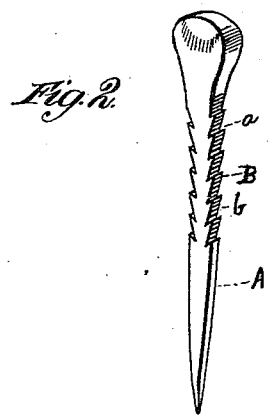 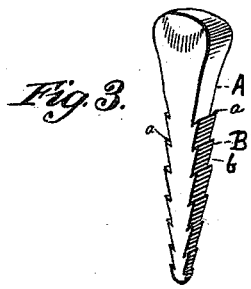

UNITED STATES PATENT OFFICE.

CALEB M. TALCOTT, OF HARTFORD, AARON W. C. WILLIAMS, OF BROOKFIELD, AND GEORGE J. CAPEWELL, OF CHESHIRE, CONNECTICUT.

HORSESHOE-NAIL.

SPECIFICATION forming part of Letters Patent No. 226,254, dated April 6, 1880.

Application filed August 29, 1879.

*To all whom it may concern:*

Be it known that we, CALEB M. TALCOTT, of the city and county of Hartford, in the State of Connecticut, AARON W. C. WILLIAMS, of the village of Brookfield, in the county of Fairfield, in the State of Connecticut, and GEORGE JOSEPH CAPEWELL, of the village of Cheshire, in the county of New Haven and State of Connecticut, have jointly invented certain new and useful Improvements in Horseshoe-Nails; and we do hereby declare the following to be a full, clear, and exact description of the invention, which will enable others skilled in the art to which it appertains to make and use the same, reference being had to the accompanying drawings, and to the letters and figures marked thereon, which form a part of this specification.

In said drawings, Figure 1 represents a perspective view of an ordinary horseshoe-nail. Fig. 2 represents a perspective view of a horseshoe-nail of similar size provided with barbs and corrugations in accordance with our invention. Fig. 3 represents a perspective view of a smaller nail similarly barbed.

The object of this invention is to provide a horseshoe-nail which shall not need clinching, and which can be relied upon to retain its position after being merely driven in. This object we accomplish by providing the edges of horseshoe-nails with barbs, somewhat like those of a fish-hook or an arrow, extending backward toward the head of the nail, and providing the tapering sides of the barbs or points with transverse ridges or notches, as hereinafter set forth.

In the accompanying drawings, A designates the body of the horseshoe-nail having indentations $a$ in its opposite edges and barbs or points B alternating therewith. As the notches or indentations $a$ are extended obliquely inward and forward, the intervening parts B assume a shape like that of the barbs of arrows, and will resist withdrawal by catching into the substance of the hoof. These barbs are preferably seven or more in number on each edge.

To insure the firm holding of the nail in the hoof, we provide the inclined face of each barb or point with transverse ridges or broad teeth $b$. These ridges or teeth are sharp enough to take hold of the material of the hoof (which fills the intervening notches when the nail is in use) and prevent the nail from working either forward or backward, thereby obviating all danger of loosening.

In applying the ordinary horseshoe-nail shown in Fig. 1, it is first driven up through the hoof and then clinched by holding a piece of metal against the head while hammering the other end, the point having previously been twisted off. Without this clinching it could not be relied upon to hold the shoe in place. The practice is, however, open to several objections. The upper side of a horse's hoof is comparatively sensitive, being less used to rough treatment than that part which normally comes into contact with the ground. This sensitiveness is often greatly increased by the diseased or irritated condition of the hoof or by unskillful shoeing, whereby the nails are driven too high up in the hoof. The clinching of the nails under such circumstances is equivalent to one or more heavy blows on the sensitive surface, followed by a permanent painful impression. In any case the clinching involves the bending down of a stub of metal on living tissue which is unaccustomed to blows and the partial embedding of the bent stub therein. Moreover, in spite of all care, it will often happen that the clinching results in leaving the nail imperfectly embedded. There being a blow at one end and metallic resistance at the other, either of them may happen to protrude a little when the work is done. If the head protrudes, it is subsequently driven in by the hammering of the shoe on hard roads, and this lifts the bent end (which is supposed to be clinched) above the hoof. This bent end is thus in either case speedily in position to tear the opposite hoof in case the horse is addicted to the common trick of clashing his feet together in fast traveling. Under such circumstances, too, the shoe becomes loosened and rattles unpleasantly, beside causing risk of stumbling, and the nails wear unnecessarily on the interior of the hoof.

All these dangers and disadvantages cease to exist when our improved nail is used. It needs no clinching whatever. In case the long form of nail shown in Fig. 2 is used, the protruding point of the nail is simply removed close to the upper surface of the hoof. There is no reverse jar of resistance to loosen the nail and drive out the head, and no pressure or blow on the top or side of the hoof. Again, if the half-length form of nail shown in Fig. 3 be used, there is not even a temporary protrusion of the nail-point.

The driving in of the nails is the sole step in the operation of shoeing with these short-barbed nails, yet they hold as firmly as a full-length ordinary nail carefully clinched.

The saving of material in the nail and of the smith's time and labor are obvious additional advantages attending the use of this barbed nail.

The cross-ridges $b$ hereinbefore described are of use in insuring the retention of the nail in its proper position. They are not dependent in any way on the barb shape of the points B, but may be employed with points which have their rearward ends at right angles to the longitudinal axis of the nail. Without some additional security, however, such as these minor ridges, the points having this latter shape could hardly be relied upon to hold with sufficient firmness.

We are aware that horseshoe-nails have heretofore been supplied with barbs, and therefore we do not broadly claim the same.

What we do claim is—

1. A horseshoe-nail having its edges provided with points or barbs which have transverse ridges or grooves in their inclined faces, said ridges or grooves being adapted to resist a loosening movement either forward or backward.

2. A half-length horseshoe-nail having its edges provided with points or barbs which have transverse ridges or grooves in their inclined faces, said ridges or grooves being adapted to resist a loosening movement either forward or backward.

In testimony that we claim the foregoing as our own we affix our signatures each in presence of two witnesses.

CALEB M. TALCOTT.
AARON W. C. WILLIAMS.
GEORGE JOSEPH CAPEWELL.

Witnesses:
GEORGE G. SILL,
GEORGE E. SILL.